United States Patent [19]
Okolischan et al.

[11] Patent Number: 4,834,358
[45] Date of Patent: May 30, 1989

[54] MODULAR FIXTURING SYSTEM

[75] Inventors: Raymond A. Okolischan, St. Louis County; William C. Wood; Theodore R. Metz, both of St. Louis, all of Mo.

[73] Assignee: Carr Lane Mfg. Co., St. Louis, Mo.

[21] Appl. No.: 152,404

[22] Filed: Feb. 4, 1988

[51] Int. Cl.[4] .............................................. B23Q 3/10
[52] U.S. Cl. ..................................... 269/309; 269/900
[58] Field of Search ................................ 269/309–310, 269/91–94, 900, 47–52

[56] References Cited

U.S. PATENT DOCUMENTS

| | | | |
|---|---|---|---|
| 3,175,820 | 3/1965 | Schiler | 269/309 |
| 3,537,701 | 11/1970 | Claycomb | 269/309 |
| 3,606,300 | 9/1971 | Davis | 269/309 |
| 3,687,441 | 8/1972 | Anderson | 269/91 |
| 4,429,862 | 2/1984 | Niedecker | 269/309 |
| 4,500,079 | 2/1985 | Morghen | 269/309 |
| 4,711,437 | 12/1987 | Longenecker et al. | 269/900 |

*Primary Examiner*—Robert C. Watson
*Attorney, Agent, or Firm*—Jerome A. Gross

[57] ABSTRACT

A modular fixturing system is provided, whose typical use is holding each of a series of similar workpieces, such as rough castings, during machining. It is conventional to support such workpieces during machining on permanent fixtures, specially designed for each type and size of workpiece, each such fixture utilizing two or more locating pins through parallel bores in the workpiece. In the present invention, locating pins are not part of any permanent fixture; instead, using a fixturing plate drilled with bores at modular intervals, the present adaptors are secured at any required spacing, and locating pins of desired diameter are mounted in them. One of the adaptors, referred to as "fixed", is mounted directly to one of the modular bores of the fixturing plate. The other adaptor to be used will be one whose position is slidably adjustable along linearly aligned slots in its base. Diamond-shaped locating pins may be used in either type of adaptor, provisions being made for their securement at desired angularity.

10 Claims, 1 Drawing Sheet

MODULAR FIXTURING SYSTEM

FIELD OF THE INVENTION

The present invention relates to fixtures for holding a series of similar parts which are to be machined, and particularly to a modular fixturing system in which the same fixture parts may be readily arranged on a plate to accommodate, in position for machining, a variety of workpieces which have parallel bores for securement on locating pins.

DESCRIPTION OF THE RELATED ART

Workpieces produced by such operations as casting and forging are conventionally machined after securement in a machine tool by a fixture having locating pins. Heretofore it has usually been necessary to design and fabricate a special fixture for each type and size of workpiece to be machined. In addition to the expense of their fabrication is the cost of, and delay incident to, fixture design. Storage and retrieval of seldom-used fixtures may also be time-consuming and costly. To remedy these problems, various attempts have been made to design certain types of standard fixture parts which may be assembled in varying configurations.

It is familiar to provide workpieces with bores to fit onto parallel locating pins. The spacing between such locating bores may vary slightly from one workpiece to another; one known method of permitting increased tolerance in this spacing is to utilize, as at least one locating pin, a so-called diamond-shaped pin. These pins have their upper end portions made slender by carving away the cylindrical surfaces of the pin on opposite sides, leaving only small arcs spaced opposite each other at the original diameter of the pin. The original tolerance of such pin in such locating bore is thus increased, provided that the pin is so aligned angularly that a line connecting the midpoints of the arcuate faces is aligned perpendicular to the line connecting the bores in the workpiece. Applicant believes that the practice heretofore has been to sink such alignment pins in the base of a permanent fixture.

SUMMARY OF THE INVENTION

One object of the present invention is to substitute for fixtures made specially for each of the types of parts to be machined, a modular fixturing system comprising a base plate drilled and tapped at convenient intervals, upon which to secure adaptors whose height is chosen to support a workpiece at a level desired for machining, and which hold locating pins of selected diameter or diamond shape; such system having the flexibility to serve a large variety of workpieces. Another purpose is to do away with the delay, effort and cost of designing special purpose fixtures, and of their storage and retrieval. Another purpose is to simplify the securement of adaptors utilized, their location and disassembly. A further purpose is to provide adaptors which hold diamond-shaped locating pins at a chosen angle, to take fullest advantage of the increased tolerance in bore spacing which they provide. These and other objects will be apparent from the description which follows.

Summarizing briefly and without limitation, the modular fixturing plate utilized is of the type having a planar upper surface with pre-drilled holes therethrough, each of them tapped for bolting adaptors thereon. The adaptors of the present invention have bodies of selected heights for supporting a workpiece at a level convenient for machining or other working. Each fixed adaptor body has a generally cylindrical chamber formed about a vertical axis and with a bottom counterbore. After inserting a socket-head bolt (or other bolt whose wrenching portion is centered in its head) through the counterbore, a bushing is preferably press-fitted in the upper portion of the chamber. Therefore the bushing need not be removed for affixing or removing the fixed adaptor from the fixturing plate.

A replaceable workpiece-locating pin, whose upper portion is of any chosen diameter and height, and whose lower pin portion fits within the bushing, has an enlarged shoulder which rests on an upper surface portion of the body. The body has an upper edge within which the pin shoulder fits, and means cooperating with complementary means on the pin shoulder, to latch the locating pin against angular movement. Conveniently these means may be a depression in the edge of the shoulder overlapped by a broad flat head screw into the body upper edge. Such latching provision is necessary to maintain alignment of a diamond-shaped latching pin when used in either a fixed or an adjustable adaptor; but is preferred when round latching pins are utilized.

A similar latching provision is utilized in the slidably adjustable adaptor, now to be described. Since the bores in workpieces may be at any chosen spacing, usually different than the spacing of the bores in the fixturing plate, the present system includes a slidably adjustable adaptor secured by two bolts in linearly aligned slots in the base of the adaptor. The adjustable securement thus provided permits the axis of the body of the adjustable adaptor to be spaced at a distance corresponding to the design distance between the bores of the workpieces. The bore of the adjustable adaptor is of such diameter as to fit the standard diameter of the lower portion of the locating pin, whose upper portion may be either round or diamond shaped, latched at its flange as heretofore described to prevent angular movement.

DESCRIPTION OF THE PREFERRED EMBODIMENT

Figure 1:
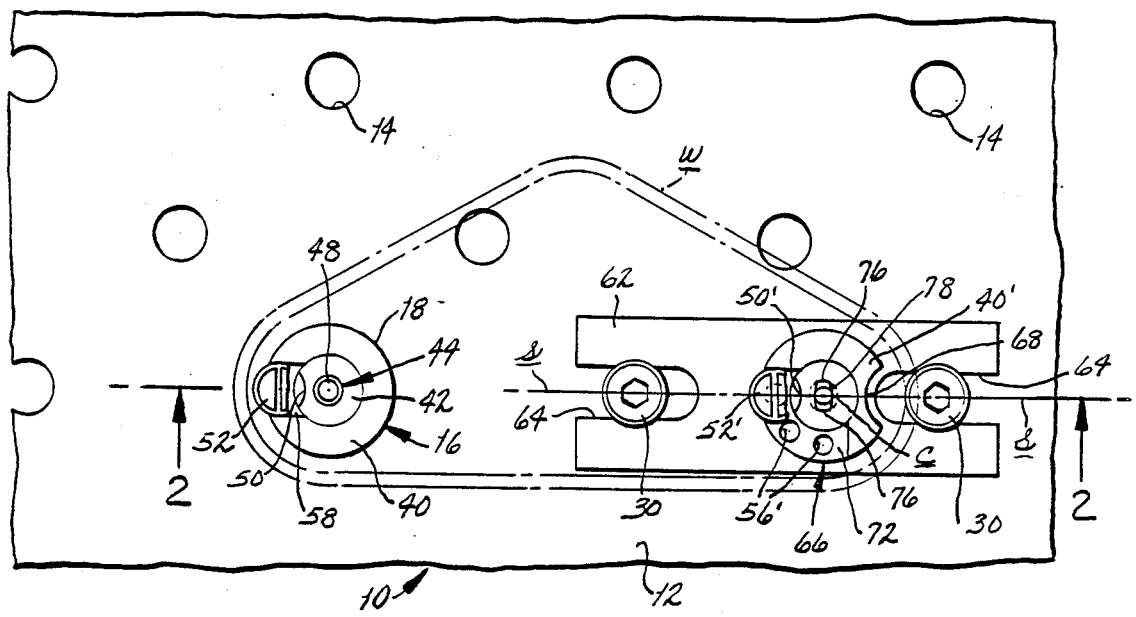
FIG. 1 is a plan view showing a fixed adaptor and a slidingly adjustable adaptor assembled on a modular plate, shown broken away, the adaptors being in position to hold a workpiece shown in phantom lines.

The preferred embodiment of the invention shown in the drawings uses as its base a fixturing plate generally designated 10 whose upper surface 12 is planar and has pre-drilled tapped bores 14 therethrough at a succession of preferably even intervals; because of this the plate 10 is referred to as a modular fixturing plate.

A fixed adaptor generally designated 16 (so called because it is secured with a single bolt to one of the tapped bores 14) has a generally hollow body 18 whose cylindrical chamber 20 is formed about an axis a. At the bottom of the cylindrical chamber 20 is a shoulder 22 which marks the upper end of a counterbore 24 through to the base 26 of the fixed adaptor 16. A bolt 30, whose threaded shank 32 is to engage one of the tapped bores 14, has a head 34 which rests on the shoulder 22 and has at its upper center an internal wrenching provision 35, such as a socket.

Press-fitted into the body 18 at its upper part is a bushing 38, recessed to a level spacedly below an upper outer edge portion 40 of the body 18. Its spacing below the upper edge 40 corresponds to the depth of a shoulder 42 on a workpiece-locating pin generally designated 44, now to be described.

The locating pin 44 has a lower cylindrical portion 46 sized to fit within the bushing 38, above which is the pin shoulder 42. The upper pin portion 48 may vary in diameter and height to engage one of the bores of a workpiece w hereafter referred to.

The shoulder 42 of the locating pin 44 preferably has an inward-extending lens-shaped latching depression 50 in its upper surface. This depression 50 is overlapped by a portion of the broad flat head 52 of a latching screw 54, engaged within a threaded bore 56 in a correspondingly depressed area 58 in the upper outer edge portion 40 of the adaptor body 18. The engagement of the screw head 52 in the shoulder's latching depression 50 holds down the round locating pin 44 and prevents it from rotating.

While it is desirable that even a round locating pin should not rotate in use, non-rotation is essential if the locating pin used is a diamond-shaped pin, such as the pin 44' shown in the slidably adjustable adaptor generally designated 60, now to be described.

The purpose of the slidably adjustable feature of the adaptor 60 is to accommodate workpieces the spacing of whose locating bores does not correspond to the spacing of the tapped bores 14 in the modular fixturing plate. Sliding adjustment requires the use of at least two bolts 30 into bores 14 for securing the fixturing plate 10. Ideally the bores 14 chosen should be aligned with the bore 14 to which the fixed adaptor 16 is secured; the slidability of the adjustable adaptor 60 then permits it to be spaced with precision relative to the fixed adaptor 16 for holding a workpiece during machining.

Figure 2:
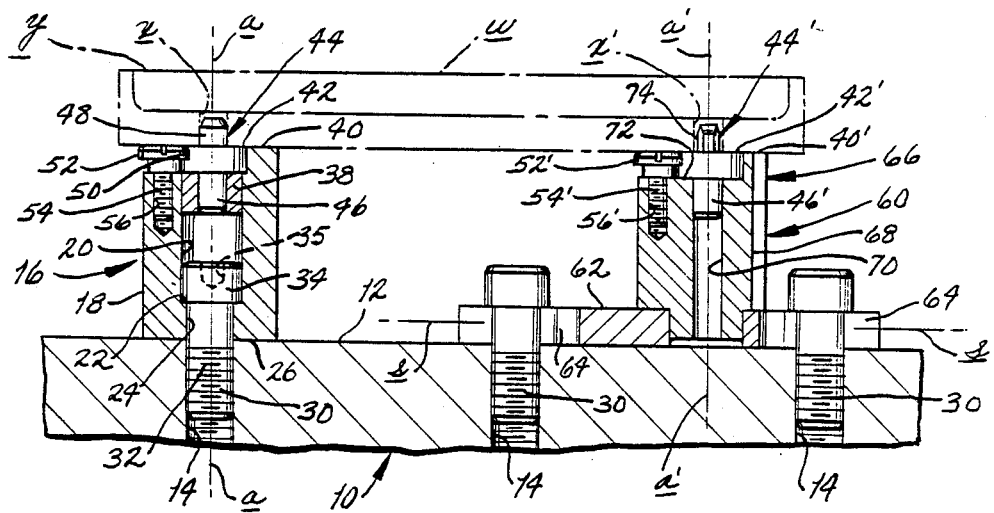
FIG. 2 is a sectional view taken along line 2—2 of FIG. 1.

To effect this purpose, the slidably adjustable adaptor 60 has an elongated generally rectangular base member 62 into each of whose ends is formed a central slot 64, the slots 64 being in linear alignment with each other on a slot axis s. Located between the slots 64 of the base member 62, and welded to it, is a vertical adjustable adaptor body generally designated 66, of generally cylindrical shape preferably relieved by a vertical notch 68 which permits extra length of the adjacent slot 64, as shown in FIGS. 1 and 2.

While a bushing might have been provided in the upper end of the cylindrical body 66, to correspond to the bushing in the fixed adaptor heretofore described, this is not necessary in the slidably adjustable adaptor because the mounting bolts 30 for the adjustable adaptor are external. Therefore in the embodiment illustrated the central bore 70 of the adjustable adaptor 60 is itself of such diameter as to receive the lower end portion 46' of the second workpiece-locating pin 44' hereafter described.

About the central bore 70 is a depressed top surface 72. Like the bushing 38 of the fixed adaptor 16, it supports the shoulder of a locating pin, but it extends outward from the bore 70 to provide a depressed area, like the are 58 of the fixed adaptor but over an angular extent of more than ninety degrees, interrupting to that extent the adaptor outer edge portion 40'. In the depressed area so provided are three threaded bores 56', located at intervals of 45 degrees, any of which may accommodate a latching screw 54' identical to the screw 54 heretofore described.

Figure 3:
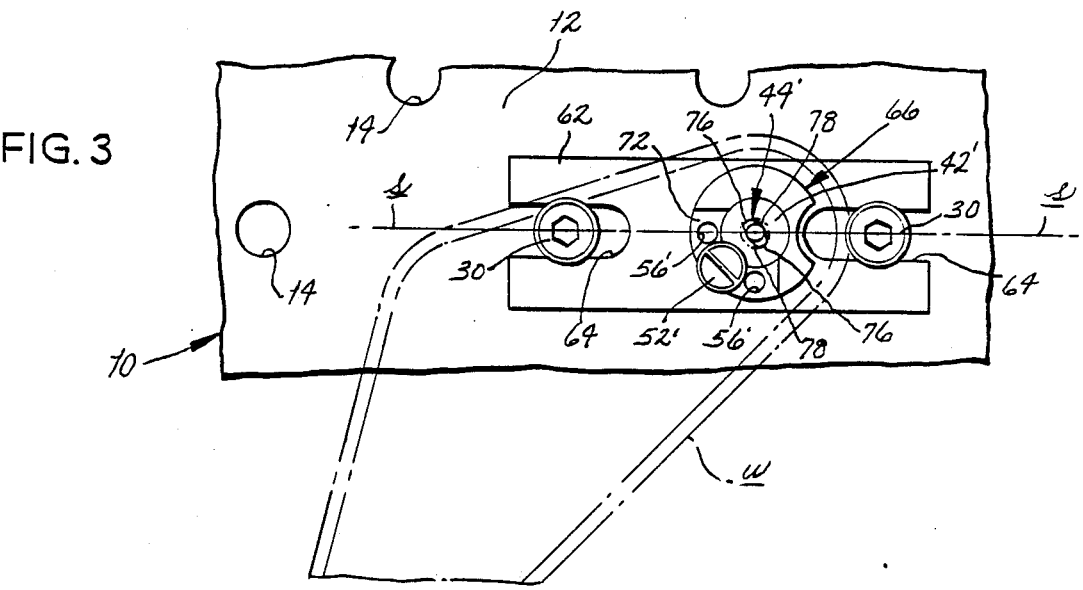
FIG. 3 is a partial view of the elements shown at the right hand side of FIG. 1, with the diamond-shaped locating pin rotated and secured at a 45 degree angle, the workpiece shown in phantom being similarly rotated.

The diamond-shaped locating pin 44' has a shoulder 42' formed identically with that of the pin 44, including a lens-shaped latching depression 50', to be engaged by the head 52' of a latching screw 54' secured in one of the tapped bores 56'. Comparison of FIG. 3 with FIG. 1 shows that the effect of selecting a tapped bore at forty-five degrees from the FIG. 1 position is to turn the diamond-shaped locating pin and secure it at 45 degrees from the axis s of the base member slots 64. This would normally be done only if the workpiece w was to be moved angularly forty-five degrees as shown in phantom lines in FIG. 3. for supporting its left side locating bore x at some location on the fixturing plate 10 other than as shown in FIG. 1, possibly by another slidably adjustable adaptor 60. The three positions of mounting which this feature makes possible may not be necessary for certain uses; if this feature was omitted the depressed top surface 72 would need to be of no greater arcuate extent than the arcuate depression 50 of the fixed adaptor 16.

Use of diamond-shaped pins is well-known; their purpose is to permit increased tolerance in the spacing between bores of a workpiece without increasing the tolerance for movement of such a workpiece about the axis of the other pin. Thus, the workpiece-locating pin 44' has its lower cylindrical portion 46' and shoulder portion 42' formed identically with those of the pin 44 heretofore described. Its diamond-shaped upper pin portion 74, conventional for such pins, is now described. Small radial arcuate faces 76 seen in FIGS. 1 and 3, each preferably about 40 degrees in length and in no event greater than 90 degrees in length, are formed diametrically opposite each other; the pin surface portions 78 intermediate them are conventionally milled to a diamond-shape, but in any event cut away so as to be a lesser distance from the pin axis. When the pin 44' is so located angularly that an imaginary line connecting its arcuate faces 76 is perpendicular to a line c which connects the axes a, a' of the two adaptors, manufacturing tolerance in the workpiece bores may be approximately three times as great as the normal tolerance between a workpiece bore diameter and locating pin diameter.

Such a workpiece w, no part of the present invention, is illustrated in phantom lines in the drawings. Its two locating bores x are drilled in production so that they may be located on the locating pins 44, 44' to permit an operation such as machining the workpiece edge y. The tolerance in spacing between the bores x, x' is at least partly compensated for by the relieved side surface portions 78, as above described. This normally would obviate the need for re-adjusting the position of the slidably adaptor 60; however, should the spacing of the workpiece bores x, x' depart from the tolerance thus afforded, the slidable adaptor may be repositioned by loosening it bolts and sliding in its slots 64. This is another advantage of the present modular fixturing system over the use of a special fixture which would have no such adjustment provision.

Referring now to FIG. 2, in using the present invention in the manner illustrated, a fixed adaptor 16 and an adjustable adaptor 60 are selected, of such heights as will support a chosen workpiece w at a level suitable for the machining or other operation to be performed. Note from FIG. 2 that all the following members provide support at this level: the upper surfaces of the shoulders 42, 42' of the workpiece-locating pins 44, 44'; the adaptor shoulders 42, 42' outwardly of them; and the broad flat heads 52, 52' of the latching screws 54, 54'.

The fixed adaptor, without a locating pin, is bolted to a convenient bore 14 of the fixturing plate 10; and an adjustable adaptor 60 is then loosely attached by bolts 30 in two of the plate bores 14 preferably in common linearity with that bore 14 to which the fixed adaptor 16 has been secured. The locating bores x, x' of a workpiece w selected as typical are then fitted over the locating pin upper portions 48, 74 as the adjustable adaptor 60 is slid sufficiently along its line of attachment to fit the locating pins 44, 44' when substantially centered within the tolerance that the workpiece locating bores x, x' provide. The bolts 30 are then tightened to affix and secure the adjustable adaptor 60 tightly in place.

In this manner, the present fixturing system functions to obviate the need for specially designed fixtures in those instances calling for the type of support which the system provides.

From this disclosure, modifications of the invention, departing from the foregoing described embodiment, will be apparent. It is therefore to be understood that within the scope of the appended claims, the invention may be practiced otherwise than as here specifically described.

We claim:

1. A modular fixturing system including
(A) a fixturing plate having a planar upper surface and pre-drilled bores therethrough,
(B) a fixed adaptor comprising
an adaptor body having an upper outer edge portion,
a generally cylindrical chamber in said body having a vertical axis and a bottom counterbore, said chamber including an upper chamber portion mounting a bushing therein and having a raised outer edge portion above the level thereof, further having a lower chamber portion leading to said counterbore,
a downwardly presented threaded bolt of the type having a wrenching provision at the center of its head, which head is accommodated just above said counterbore,
an annular bushing in said cylindrical chamber above the head of said bolt, whereby the bore of said bushing provides access for wrenching said bolt, further comprising
a removable and replaceable workpiece-locating pin having a central axis, an upper pin portion, a lower pin portion fitted into said bushing along said axis, and an annularly enlarged shoulder separating said upper and lower pin portions, said shoulder being supported by the said annular bushing,
the said upper pin portion having two diametrically opposite arcuate faces each comprising a radial arc of less than ninety degrees, the intermediate pin surface portions between said arcuate faces being of lesser distance from such central axis,
the said fixed adaptor body further having an upper outer raised edge portion, said outer edge portion and said locating pin shoulder having complementary means to latch the locating pin against angular movement about its said axis, said means to latch comprising
a lens-shaped depression upper surface edge of the annularly-enlarged locating pin shoulder along its outer edge, and
a depressed part of the upper outer edge portion of said adaptor body, said depressed part having a vertical tapped bore, and
a bolt therein having a broad head extending over and fitting in said lens-shaped depression in the locating pin shoulder in combination with
(C) a slidingly adjustable adaptor including
an adaptor body having a pair of linearly aligned horizontal slotted means in its base, whereby to provide for adjustable securement to said plate therebeneath,
said adaptor body further having means to provide a central vertical bore, an annular upper surface thereabout and a raised edge portion outwardly of said annular surface,
a removable and replaceable workpiece-locating pin having a central axis, an upper pin portion, a lower pin portion fitted in said vertical bore, and an annularly enlarged shoulder separating said upper and lower pin portions, said shoulder being supported by the said annular upper surface of said body,
the upper pin portion having two diametrically opposite arcuate faces each comprising a radial arc of less than ninety degrees, the intermediate pin surface portions between said arcuate faces being of lesser distance from such central axis,
the said raised edge portion of said body's annular upper surface and said locating pin shoulder having complementary means to latch the locating pin in one of a plurality of angular positions against angular movement, said means to latch comprising
a lens-shaped depression upper surface edge of the annularly-enlarged locating pin shoulder along its outer edge, and
a depressed part of the upper outer edge portion of said adaptor body, said depressed part having a vertical tapped bore, and
a bolt therein having a broad head extending over and fitting in said lens-shaped depression in the locating pin shoulder.

2. A slidingly adjustable adaptor comprising
an adaptor body having a pair of linearly aligned horizontal slotted means in its base, whereby to provide for adjustable securement to said plate therebeneath,
said adaptor body further having a central vertical bore and means to provide an annular upper surface thereabout, together with
a latching edge portion radially outward of said annular upper surface, and means in said latching edge portion to latch spacedly over its said annular upper surface,
whereby said annular surface may serve to support the shoulder of a removable and replaceable workpiece-locating pin when its lower pin portion is inserted in said central vertical bore and its shoulder is secured in position upon said annular upper surface by said means to latch.

3. A slidably adjustable adaptor as defined in claim 2, in combination with
a removable and replaceable workpiece-locating pin having a central axis, an upper pin portion, a lower pin portion fitted in said vertical bore, and an annularly enlarged shoulder positioned on and supported by the annular upper surface of said body inward of its said latching edge portion and beneath its said means to latch.

4. A slidably adjustable adaptor as defined in claim 3, in which
   the upper pin portion of said workpiece-locating pin has two diametrically opposite arcuate faces each comprising a radial arc of less than 90°, the intermediate pin surface portions between said arcuate faces being of lesser distance from such central axis, whereby when fitted into said cylindrical bore, such pin portion affords greater tolerance in the direction perpendicular to a diameter connecting the midpoints of said arcuate faces, and wherein
   the said means in the latching edge portion of said adaptor body to latch spacedly over its said annular upper surface comprises means to latch such locating pin against angular movement in a plurality of angular positions at least one of which is at 90° to another of said positions.

5. A slidably adjustable adaptor as defined in claim 4 wherein said means to latch said locating pin against angular movement comprises a bolt having a radially enlarged head, and wherein
   said locating pin shoulder has along its outer edge two lens-shaped depressions spaced at 90° to each other into which the head of said bolt fits latchingly.

6. A fixed adaptor as defined in claim 3, in combination with
   a removable and replaceable workpiece-locating pin having a central axis, an upper pin portion, a lower pin portion fitted into the bushing along said axis, and an annularly enlarged shoulder separating said upper and lower pin portions, said shoulder being seated upon the said annular bushing.

7. A fixed adaptor as defined in claim 6, in which the said latching edge portion is at a level spaced above the bushing an amount substantially equal to the thickness of the said locating pin shoulder.

8. A fixed adaptor as defined in claim 6, the said upper pin portion having two diametrically opposite arcuate faces each comprising an arc of less than ninety degrees, the intermediate pin surface portions between said arcuate faces being of lesser distance from such central axis,
   the said latching edge portion and said locating pin shoulder having complementary means to latch the locating pin against angular movement about its said axis.

9. A fixed adaptor as defined in claim 8, in which said complementary means to latch comprises
   a lens-shaped depression upper surface edge of the annularly-enlarged locating pin shoulder along its outer edge, and
   a depressed part of the upper outer edge portion of said adaptor body, said depressed part having a vertical tapped bore, and
   a bolt therein having a broad head extending over and fitting in said lens-shaped depression in the locating pin shoulder.

10. For securement to a modular fixturing plate, a fixed adaptor comprising
    a hollow cylindrical adaptor body having a vertical axis and a bottom counterbore of smaller diameter, and
    a bushing supported in said adaptor body spacedly above said bottom counterbore, whereby such space may accommodate the head of a mounting bolt extending downward through said counterbore and such bolt head may be wrenched through said bushing, the adaptor body having
    a substantially planar upper edge portion outward of said bushing formed perpendicular to said axis, and a latching portion including means for latching radially inward therefrom spacedly above said bushing,
    whereby a workpiece-locating pin having a shoulder between upper and lower pin portions may be accommodated with its lower pin portion within said bushing and its shoulder resting thereon and latched by said latching means against angular movement.

* * * * *